US012546690B2

(12) United States Patent
Shahedipour-Sandvik et al.

(10) Patent No.: US 12,546,690 B2
(45) Date of Patent: Feb. 10, 2026

(54) SYSTEMS AND METHODS FOR ANNEALING SAMPLES

(71) Applicant: The Research Foundation for the State University of New York, Albany, NY (US)

(72) Inventors: Fatemeh Shahedipour-Sandvik, Niskayuna, NY (US); Vincent Meyers, Albany, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 254 days.

(21) Appl. No.: 17/707,222

(22) Filed: Mar. 29, 2022

(65) Prior Publication Data

US 2022/0317002 A1 Oct. 6, 2022

Related U.S. Application Data

(60) Provisional application No. 63/168,415, filed on Mar. 31, 2021.

(51) Int. Cl.
 *G01N 1/44* (2006.01)
 *G05D 23/19* (2006.01)
 *G05D 23/27* (2006.01)
 *H05B 6/64* (2006.01)
 *H05B 6/80* (2006.01)

(52) U.S. Cl.
 CPC .............. *G01N 1/44* (2013.01); *G05D 23/19* (2013.01); *G05D 23/27* (2013.01); *H05B 6/645* (2013.01); *H05B 6/80* (2013.01); *H05B 6/806* (2013.01)

(58) Field of Classification Search
 CPC . G01N 1/44; H05B 6/806; H05B 6/80; H05B 6/645; G05D 23/27; G05D 23/19
 See application file for complete search history.

(56) References Cited

U.S. PATENT DOCUMENTS

| | | | | |
|---|---|---|---|---|
| 2003/0178417 A1* | 9/2003 | Yau | ........................ | H05B 6/806 |
| | | | | 219/678 |
| 2005/0181126 A1* | 8/2005 | Bergstrom | .............. | H05B 6/105 |
| | | | | 427/218 |
| 2006/0124613 A1* | 6/2006 | Kumar | ...................... | H05H 1/46 |
| | | | | 219/121.43 |
| 2009/0184399 A1* | 7/2009 | Kowalski | .......... | H01L 21/67098 |
| | | | | 219/730 |
| 2010/0273277 A1* | 10/2010 | Qin | .................... | H01L 21/67248 |
| | | | | 438/798 |
| 2011/0074013 A1* | 3/2011 | Ueda | ................. | H01L 21/02274 |
| | | | | 423/325 |
| 2011/0226759 A1* | 9/2011 | Wander | .................. | H05B 6/645 |
| | | | | 219/702 |

(Continued)

*Primary Examiner* — Helen C Kwok
(74) *Attorney, Agent, or Firm* — Garrett Smith (57) ABSTRACT

A system and method for annealing samples. The system includes a thermal shielding enclosure including a cavity, with a first surface, a second surface, a microwave emitter, a sensor and a control system. Additionally, the control system can adjust operational characteristics of the microwave emitter in response to determining whether the measured temperature of the sample is equal to or greater than a first predetermined temperature of the sample or is equal to or less than a second predetermined temperature of the sample.

20 Claims, 9 Drawing Sheets

(56) References Cited

U.S. PATENT DOCUMENTS

| | | | | |
|---|---|---|---|---|
| 2011/0278284 | A1* | 11/2011 | Tian | H01L 21/50 |
| | | | | 219/702 |
| 2012/0086107 | A1* | 4/2012 | Yamamoto | H01L 21/0228 |
| | | | | 257/632 |
| 2012/0129358 | A1* | 5/2012 | Ogawa | H01L 21/67115 |
| | | | | 257/E21.328 |
| 2012/0196453 | A1* | 8/2012 | Alford | H05B 6/80 |
| | | | | 257/E21.333 |
| 2014/0008352 | A1* | 1/2014 | Uemura | H01J 37/32477 |
| | | | | 219/601 |
| 2014/0038431 | A1* | 2/2014 | Stowell | H01L 21/67115 |
| | | | | 438/795 |
| 2014/0073065 | A1* | 3/2014 | Ohno | H05B 6/6455 |
| | | | | 219/710 |
| 2014/0335339 | A1* | 11/2014 | Dhillon | C30B 25/10 |
| | | | | 501/86 |
| 2015/0144622 | A1* | 5/2015 | Hong | H05B 6/806 |
| | | | | 219/754 |
| 2016/0227612 | A1* | 8/2016 | Kowalski | H05B 6/6447 |
| 2018/0204735 | A1* | 7/2018 | Yuasa | H01L 21/0245 |
| 2018/0269037 | A1* | 9/2018 | Kamarehi | H05B 6/645 |
| 2019/0006218 | A1* | 1/2019 | Toyoda | H01L 21/67745 |
| 2020/0013646 | A1* | 1/2020 | Sasaki | H01L 21/67248 |
| 2020/0123653 | A1* | 4/2020 | Scholz | C30B 25/20 |
| 2021/0023526 | A1* | 1/2021 | Watanabe | B01J 19/126 |
| 2021/0095373 | A1* | 4/2021 | Ballantine | C25B 15/081 |
| 2022/0369430 | A1* | 11/2022 | Kou | B23K 26/702 |

\* cited by examiner

FIG. 9

SYSTEMS AND METHODS FOR ANNEALING SAMPLES

CROSS-REFERENCE TO RELATED APPLICATIONS

The present disclosure claims priority or the benefit under 35 U.S.C. § 119 of U.S. provisional application No. 63/168,415 filed 31 Mar. 2021, which is herein entirely incorporated by reference.

RIGHTS IN THE INVENTION

This invention was made with government support under Grant No. DE-AR0000872 awarded by the U.S. Department of Energy. The government has certain rights in the invention.

BACKGROUND OF THE INVENTION

The disclosure relates generally to annealing material, and more particularly, to a system and method for annealing a sample.

During the process of dopant activation (in bulk material or selectively implanted regions for junctions, for example) the material's electrical conductivity changes. Change in the material conductivity affects the rate at which microwave energy of a given frequency and electric field strength interact with the material. When sufficient energy is absorbed, there will be a change in conductivity, and this change is indicated by the rate at which temperature rises in response to a microwave source. In conventional systems, the monitoring systems are based on continuous annealing of a semiconductor material, using photovoltage measurement of the surface, requires two sets of temperature monitoring, or a combination of these.

BRIEF DESCRIPTION OF THE INVENTION

A first aspect of the disclosure provides a multi-pulse rapid thermal annealing system. The system includes: a thermal shielding enclosure including a cavity, the cavity receiving a sample having a first surface and a second surface opposite the first surface; a microwave emitter positioned within the cavity of the thermal shielding enclosure; a sensor positioned within the cavity of the thermal shielding enclosure; and a control system electrically coupled to the microwave emitter and the sensor, the control system configured to adjust operational characteristics of the microwave emitter by performing processes including: measuring a temperature of the sample using the sensor; and at least one of: adjusting operational characteristics of the microwave emitter in response to determining the measured temperature of the sample is equal to or greater than a first predetermined temperature of the sample, or adjusting the operational characteristics of the microwave emitter in response to determining the measured temperature of the sample is equal to or less than a second predetermined temperature of the sample.

A second aspect of the disclosure provides a method for annealing a material included within a sample. The method including: applying a microwave energy to the sample using a microwave emitter, the sample having a first surface and a second surface opposite the first surface; measuring a temperature of the sample receiving the microwave energy; and at least one of: adjusting operational characteristics of the microwave emitter in response to determining the measured temperature of the sample is equal to or greater than a first predetermined temperature of the sample, or adjusting the operational characteristics of the microwave emitter in response to determining the measured temperature of the sample is equal to or less than a second predetermined temperature of the sample.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to annealing material, and more particularly, to a system and method for annealing a sample.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
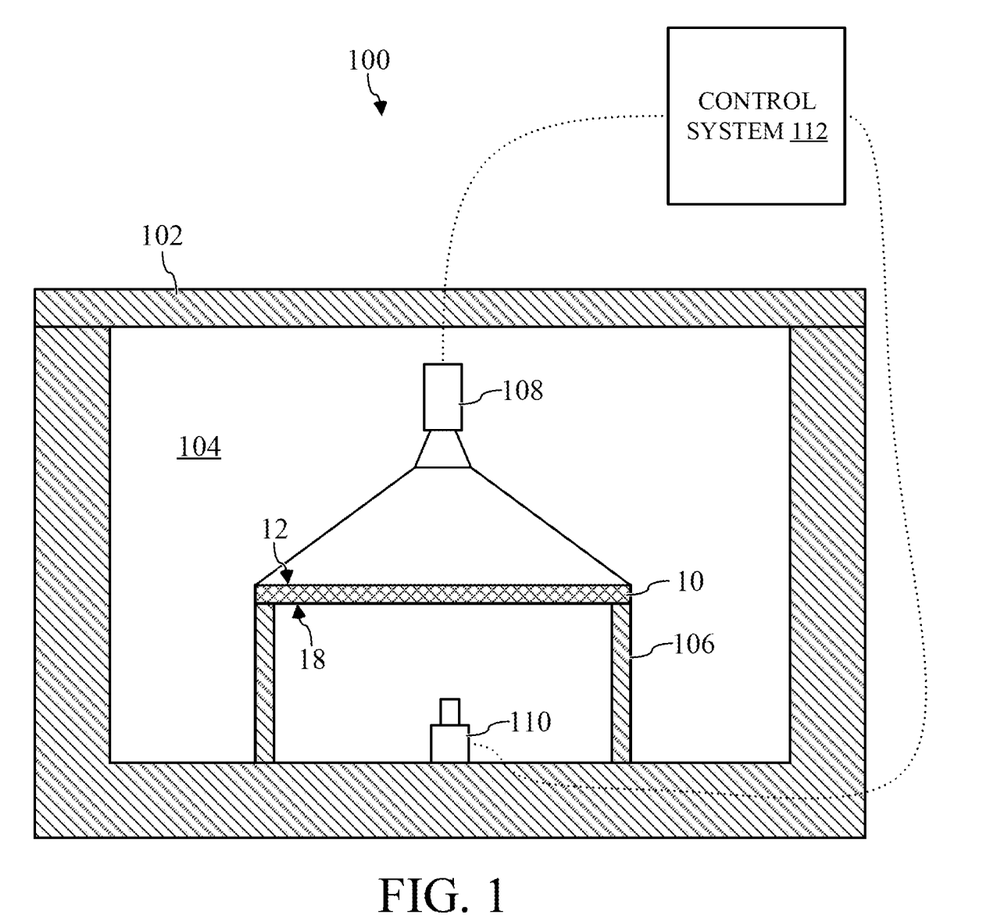
FIG. 1 shows a front cross-sectional view of an annealing system, according to embodiments of the disclosure.

FIG. 1 shows front cross-sectional view of a multi-rapid thermal annealing system 100 (hereafter, "system 100"). System 100 may be used for performing an annealing process on devices, components, materials, and/or samples during the manufacturing on the same, as discussed herein. System 100 may include a thermal shielding enclosure 102 (hereafter, "enclosure 102"). As shown in FIG. 1, enclosure 102 may include and/or form a cavity 104 therein. That is, enclosure 102 may substantially surround and/or define cavity 104. Enclosure 102 may house and/or include components, apparatuses, and/or features of system 100 that are used to anneal samples/materials as discussed herein. Enclosure 102 may be formed as and/or configured as any suitable geometry, shape, assembly, and/or configuration that may be sealed or may seal cavity 104 during the annealing process. That is, and as discussed herein, enclosure 102 may be configured to be sealed during operation, such that cavity 104 may be maintained at a predetermined pressure, and/or cavity 104 may be filled with and maintain a gas (e.g., inert gases such as nitrogen (N), sulfur hexafluoride ($SF_6$), Argon (Ar)) dispersed therein during the annealing process, as discussed herein.

In a non-limiting example, enclosure 102 may be formed from any suitable material or material combination that may withstand high temperatures (e.g., 1300° C.) during the annealing process. Furthermore, enclosure 102 may be formed from any suitable material that may prevent the leakage of microwave energy, and/or may absorb microwave energy emitted within cavity 104. In non-limiting examples, enclosure may be formed from metal, metal alloys, ceramics, polymer, fiberglass, and/or any other suitable material(s).

System 100 may also include at least one support 106. Support(s) 106 may be positioned within cavity 104 of enclosure 102. As shown in FIG. 1, support 106 may receive sample 10. More specifically, support 106 may receive, hold, secure, and/or maintain sample 10 in a fixed positioned during the annealing process. Support 106 may be formed, shaped, and/or configured in any suitable configuration that may hold or secure sample 10 within enclosure 102 during the annealing process, as discussed herein. In the non-limiting example shown in FIG. 1, support 106 may be formed as two distinct arms or protrusions that extend from the bottom/base of enclosure 102 and secure/suspend sample 10 into cavity 104 of enclosure 102 of system 100. Support(s) 106 may be fixed within enclosure 102 and may maintain the position of the sample 10 undergoing the annealing process, or alternatively, may be configured to move and/or manipulate the sample 10 received therein during the annealing process.

In the non-limiting example shown in FIG. 1, sample 10 may be any component, product, and/or article of manufacture that may undergo an annealing process and/or may include a portion or material that may undergo an annealing process. In a non-limiting example, sample 10 may be formed as a wafer including a plurality of semiconducting devices. In the example, each of the semiconducting devices may include a layer of material that undergoes the annealing process during the formation/build process of each semiconducting device. The material of sample 10 that require annealing may include, but are not limited to, Gallium Nitride (GaN), Aluminum Nitride (AlN), Indium Nitride (InN), Aluminum Indium Nitride (AlInN), Gallium Aluminum Indium Nitride (GaAlInN), Silicon Carbide (SiC), Gallium Oxide (GaO), or any other suitable material having similar material/mechanical characteristics. Sample 10 may include a first surface 12 and a second surface 18, positioned opposite first surface 12. At least one of first surface 12 or second surface 18 may include the material or layer of material of sample 10 that requires annealing.

System 100 may also include a microwave emitter 108 (hereafter, "emitter 108"). Emitter 108 of system 100 may be positioned within cavity 104 of enclosure 102, and may be positioned adjacent sample 10 received by support 106. In the non-limiting example shown in FIG. 1, emitter 108 may be positioned adjacent to and substantially above sample 10. Where first surface 12 or the material formed on first surface 12 of sample 10 requires annealing, first surface 12 may be positioned directly adjacent to and/or exposed to emitter 108 within enclosure 102. First surface 12 may be exposed to receive microwave energy emitted or directed toward sample 10 by emitter 108 of system 100. Emitter 108 may be any suitable device, component, and/or apparatus that may be configured to emit microwave energy and/or beams at sample 10. For example, emitter 108 may be cavity magnetron emitters, commonly referred to as magnetrons, or gyrotrons.

System 100 of FIG. 1 may also include at least one sensor 110. Sensor 110 may be positioned within cavity 104 of enclosure 102. In the non-limiting example, sensor 110 may be positioned within enclosure 102, adjacent second surface 18 of sample 10. Additionally in the non-limiting example shown in FIG. 1, sensor 110 may be positioned within cavity 104 opposite emitter 108, and/or below emitter 108 and sample 10, respectively. In other non-limiting examples (see, FIGS. 4 and 5), sensor 110 may be positioned in different portions or areas within cavity 104 of enclosure 102. Sensor 110 may be any suitable device configured to measure the temperature of sample 10 undergoing the annealing process. More specifically, sensor 110 may be any device or apparatus that may measure, detect, calculate, and/or determined the temperature of surfaces 12, 18 of sample 10 and/or the material forming surfaces 12, 18 of sample 10 during the annealing process performed by system 100. In a non-limiting example, sensor may be an infrared (IR) sensor. Although a single sensor 110 is shown, it is understood that system 100 may include more sensors configured to detect and/or measure the temperature of sample 10 during the annealing process.

As shown in FIG. 1, system 100 may also include a control system 112. Control system 112 may be a stand-alone system, or alternatively may be a portion and/or included in a larger computing device (not shown) of system 100. As discussed herein, control system 112 may be configured to control system 100 to aid in the annealing of sample 10. As shown in FIG. 1, control system 112 may be in electronic communication with and/or communicatively coupled to various devices, apparatuses, and/or portions of system 100. In non-limiting examples, control system 112 be hard-wired and/or wirelessly connected to and/or in communication with system 100, and its various components via any suitable electronic and/or mechanical communication component or technique. For example, control system 112 may be in electronic communication with emitter 108 and sensor 110, respectively. Control system 112 may be in communication with emitter 108 to control the operation and/or operational characteristics of emitter 108 during the annealing process discussed herein. That is, and as discussed herein, control system 112 may control, adjust, and/or maintain the operational characteristics of emitter 108 (e.g., power output, pulse length, number of pulse cycles, and so on) based on the measured temperature of sample 10, during the annealing process. Additionally, and as discussed herein, control system 112 may be in communication with sensor 110 to receive, process, and/or analyze temperature data detected, measured, and/or obtained by sensor 110 to perform the annealing process using system 100.

Figure 2:
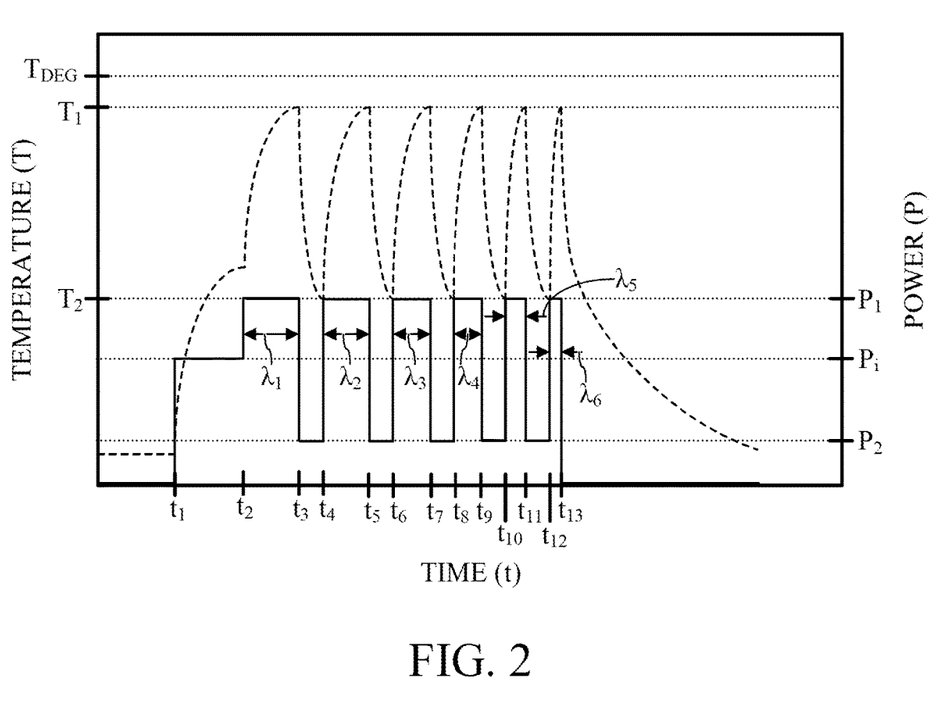
FIG. 2 shows a chart including a measured temperature of a sample and a power output of a microwave emitter of the annealing system shown in FIG. 1 undergoing an annealing process, according to embodiments of the disclosure.

As discussed herein, system 100 may be used to anneal sample 10, and more specifically, system 100 shown in FIG. 1 may be used to anneal the material included on and/or forming first surface 12 and/or second surface 18 of sample 10. With continued reference to FIG. 1, the annealing process performed by system 100 will now be discussed herein with respect to FIG. 2. FIG. 2 shows a non-limiting example of a chart including measured, detected, obtained, and/or calculated data for system 100 during the annealing process is shown. For example, FIG. 2 depicts a chart of the measured temperature of sample 10 and a power output from system 100 during the annealing process. The temperature of sample 10 may be measured, obtained, detected, and/or calculated by sensor 110 during the annealing process. In non-limiting examples, sensor 110 may measure the temperature of the sample 10 at the center of sample 10, and/or at least one edge of sample 10—dependent, at least in part, on the position of sensor 110 within cavity 104 with respect to sample 10. Additionally, the power output may be the power output or measured microwave energy emitted by emitter 108 of system 100 during the annealing process.

First, sample 10 may be placed, secured, fixed, and/or positioned within cavity 104 of enclosure 102. As discussed herein, sample 10 may be fixed, secured, and positioned within cavity 104 via supports 106. Once positioned within cavity 104 of enclosure 102, enclosure 102 of system 100 may be closed and/or sealed. That is, and in one non-limiting example, once sample is positioned within enclosure 102, enclosure 102 may be sealed such that cavity may include and/or maintain a predetermined pressure during the annealing process/during operation of emitter 108. The maintained, predetermined pressure within cavity 104 during the annealing process may improve and/or expedite the annealing of sample 10 and/or the material included in sample 10. In other non-limiting examples (see, FIG. 4) after sample 10 is positioned within cavity 104 and enclosure is sealed, a gas may be dispersed throughout sealed cavity 104 during the annealing process. In the non-limiting examples discussed herein, the pressure of the gas surrounding the sample formed from the predetermined material (e.g., nitrogen and Gallium Nitride (GaN)) may determine the maximum temperature at which the material may be thermodynamically stable. Additionally, the predetermined gas pressure may improve annealing by inhibiting, preventing, and/or substantially minimizing degradation of the sample material. Alternatively, or additionally, the annealing process of sample 10 may further be expedited by permitting or allowing more injected energy/high temperatures over less/a reduced time during the annealing process which may result in minimal or no degradation of the sample 10.

After sealing and/or pressurizing cavity 104 of enclosure 102, sample 10 may be heated to begin the annealing process. That is, at a first time ($t_1$) system 110 may heat and/or emit energy toward sample 10 to begin the annealing process. In the non-limiting example, control system 112, in electrical communication with emitter 108, may engage and/or adjust operational characteristics of emitter 108 from non-operational (e.g., zero power output) to a preliminary or initial power output ($P_i$). Emitter 108 may emit and/or discharge microwave energy toward sample 10 at the initial power output ($P_i$) to initially increase the temperature of sample 10 and/or the material formed on a surface (e.g., first surface 12) of sample 10 that undergoes the annealing process. Increasing the temperature of the sample 10 gradually by exposing sample 10 to microwave energy emitted at initial power output ($P_i$) may prepare sample 10 to receive various pulses of microwave energy from emitter 108 during the annealing process. Additionally, or alternatively, may prevent undesired strain and/or stress on sample 10/the material formed thereon during the annealing process, if control system 112 was to instantly expose sample to microwave energy from emitter 108 at a first predetermined power output ($P_1$), as discussed herein.

Emitter 108 may operate at initial power output ($P_i$) until sample 10 has reached a desired initial temperature, and/or for a predetermined time. As shown in FIG. 2, at a second time ($t_2$) the operational characteristics of emitter 108 may be altered, adjusted, and/or changed. More specifically, at second time ($t_2$) control system 112 may increase the power output of emitter 108 to a first predetermined power output (P1). First predetermined power output (P1) may be predetermined and/or calculated based on material/mechanical characteristics of sample 10 and/or the material of sample 10 that is undergoing the annealing process. For example, first predetermined power output (P1) may be predetermined and/or calculated based on, at least in part, the material composition of sample 10/the material undergoing the annealing process, the thermal/electrical conductivity of the material of sample 10 undergoing the annealing process, the amount/thickness/surface area of material of sample 10 undergoing the annealing process, a predetermined/desired rate for increasing the temperature (e.g., greater rate=higher power output, and/or any other suitable material/mechanical characteristics of the material of sample 10.

Control system 112 may maintain the emission of microwave energy from emitter 108 at the first predetermined power output (P1) until the material of sample 10 reaches a first predetermined temperature (T1). That is, emitter 108 may emit and expose sample 10 to microwave energy at the first predetermined power output (P1) until sensor 110, (continuously) measuring the temperature of sample 10, measures, detects, and/or determines that the temperature of sample 10 is equal to the first predetermined temperature (T1). Once sensor 110 measures, and control system 112 determines, that the temperature of the sample is equal to the first predetermined temperature (T1), control system 112 may adjust the operational characteristics of emitter 108. In the non-limiting example shown in FIG. 2, the material of sample 10 may equal the first predetermined temperature (T1) at a third time ($t_3$). In response to determining that the material of sample 10 may equal the first predetermined temperature (T1), control system 112 may instantly reduce the power output of emitter 108 from the first predetermined power output (P1) to a second predetermined power output (P2) at third time ($t_3$).

Similar to first predetermined power output (P1), the first predetermined temperature (T1) may be based on, at least in part, the material composition of sample 10/the material undergoing the annealing process, and/or the thermal/electrical conductivity of the material of sample 10 undergoing the annealing process. Furthermore, the first predetermined temperature (T1) may also be a temperature below a predefined and/or calculated desorption or thermally-induced degradation temperature ($T_{deg}$) (hereafter, "degradation temperature ($T_{deg}$)") for the material of sample 10 undergoing the annealing process. In a non-limiting example, the first predetermined temperature (T1) may be a temperature that is a deviation or magnitude (A) below the degradation temperature ($T_{deg}$) to ensure the sample 10/material thereon does not undergo a degradation, for example a desorption, phenomenon during the annealing process.

As shown in FIG. 2, the second predetermined power output (P2) may be less than the first predetermined power output (P1). Additionally in the non-limiting example, second predetermined power output (P2) may be greater than zero (e.g., shutting down emitter 108). Similar to first predetermined power output (P1), second predetermined power output (P2) may be predetermined and/or calculated based on, at least in part, the material composition of sample 10/the material undergoing the annealing process, the thermal/electrical conductivity of the material of sample 10 undergoing the annealing process, the amount/thickness/surface area of material of sample 10 undergoing the annealing process, and/or any other suitable material/mechanical characteristics of the material of sample 10. Additionally, second predetermined power output (P2) may be predetermined and/or calculated based on a desired second predetermined temperature (T2) of the material of sample 10 and/or the cooling rate/characteristics of the material of sample 10 to ensure that the material undergoing the annealing process can cool down to the second predetermined temperature (T2), as discussed herein.

Once emitter 108 is emitting microwave energy at the second predetermined power output (P2), the temperature of sample 10/the material of sample 10 may begin to decrease. Similar to between second time (T2) and third time (T3), control system 112 may maintain the operational characteristics of emitter 108 when the measured temperature of sample 10/the material of sample 10 is between the first predetermined temperature (T1) and the second predetermined temperature (T2). That is, control system 112 may maintain the microwave energy emission from emitter 108 at the second power output (P2) when the measured temperature of sample 10/the material of sample 10 is between the first predetermined temperature (T1) and the second predetermined temperature (T2). As such the second power output (P2) for emitter 108 may allow sample 10/the material thereon to cool/reduce in temperature. As shown in the non-limiting example, second predetermined temperature (T2) may be lower or less than the first predetermined temperature (T1). Second predetermined temperature (T2) may be based on, at least in part, a temperature that may lower annealing time by lowering the amount by which the sample must be heated to first predetermined temperature (T1) (e.g., less difference between T1 and T2=less time), and/or provides a consistent temperature interval or difference between T1 and T2 that may measure/define a temperature ramp time, which in turn may correlate with microwave absorption efficiency . . . .

However, once sensor 110 measures, detects, and/or determines that the temperature of sample 10 is equal to the second predetermined temperature (T2), control system 112 may again adjust the operational parameters of emitter 108. That is, after sensor 110 measures, and control system 112 determines, that the temperature of the sample is equal to the second predetermined temperature (T2), control system 112 may adjust the operational characteristics of emitter 108. In the non-limiting example shown in FIG. 2, the material of sample 10 may equal the second predetermined temperature (T2) at a fourth time ($t_4$). In response to determining that the material of sample 10 may equal the second predetermined temperature (T2), control system 112 may instantly increase the power output of emitter 108 from the second predetermined power output (P2) back to the first predetermined power output (P1) at fourth time ($t_4$).

Also in this non-limiting example, at fourth time ($t_4$) a first pulse cycle of emitter 108 may be complete. That is, and with respect to the chart shown in FIG. 2, a full pulse cycle may be complete after sample 10 has been exposed to microwave energy from emitter 108 at both the first predetermined power output (P1) and the second predetermined power output (P2). Once control system 112 adjusts the operational characteristics of emitter 108 to emit microwave energy at the first predetermined power output (P1) again (e.g., at fourth time ($t_4$)), then a new pulse cycle has begun (e.g., pulse cycle 2 having second pulse length ($\lambda_2$)).

Control system 112 may again maintain emitter 108 at the first predetermined power output (P1) until the measured temperature of sample 10/the material of sample 10 is equal to the first predetermined temperature (T1) (e.g., fifth time (t5)), at which point control system 112 will adjust the power output of emitter 108 again to the second predetermined power output (P2). Control system 112 may continue to adjust the operational characteristics of emitter 108, based on the measure temperature of sample 10, for a predetermined number of cycles to anneal sample 10/the material of sample 10. In the non-limiting example shown in FIG. 2, sample 10 may undergo and/or be exposed to six (6) pulse cycles by emitter 108 of system 100 to anneal sample 10/the material included therein. Once system 100 has exposed sample 10 to the predetermined number of pulse cycles, emitter 108 may be shutdown/powered down (e.g., time (t13)), and sample 10 may cool beyond second predetermined temperature (T2). The predetermined number of cycles may be calculated and/or based on material/mechanical characteristics of sample 10 and/or the material of sample 10 that is undergoing the annealing process. For example, the number of pulse cycles may be predetermined and/or calculated based on, at least in part, the material composition of sample 10/the material undergoing the annealing process, the thermal/electrical conductivity of the material of sample 10 undergoing the annealing process, the amount/thickness/surface area of material of sample 10 undergoing the annealing process, the length/time of a preceding pulse cycle (where applicable) (e.g., $T_n - T_{n-1}$), and/or any other suitable material/mechanical characteristics of the material of sample 10. Although six pulse cycles are shown, it is understood that sample 10 may experience more or less pulse cycles during the annealing process performed by system 100.

As shown in FIG. 2, as time goes on and/or the number of pulse cycles increases, the pulse length ($\lambda$) of microwave energy emitted by emitter 108 to anneal sample 10 decreases. For example, the first pulse length ($\lambda_1$) is the largest/longest pulse length during the annealing process of sample 10. Subsequent pulse lengths ($\lambda_2$, $\lambda_3$, $\lambda_4$ and so on), by comparison are shorter than the first pulse length ($\lambda_1$) and continue to decrease in length from the second pulse length ($\lambda_2$) to the sixth pulse length ($\lambda_6$). This may be attributed to the fact that as pulse cycles go on, the time it takes for sample 10/the material of sample 10 to reach or heat to the first predetermined temperature (T1) decreases. The time to reach the first predetermined temperature (T1) may decrease as the number of pulse cycles increases may be a result of the change in electrical conductivity of sample 10/the material of sample 10 undergoing the annealing process. That is, as sample 10 is exposed to microwave energy from emitter 108, the electrical conductivity of sample 10/the material therein may change (e.g., increase) as a result of, for example, activating dopants in the material forming sample 10. Therefore, in later pulse cycles, sample 10 having a higher electrical conductivity may absorb more microwave energy from emitter 108 and ultimately may reach the first predetermined temperature (T1) faster/in less time. Because control system 112 adjusts the power output of emitter 108 automatically based on the measured temperature of sample 10, the pulse length (λ) of each pulse cycle may also be adjusted automatically, and based on the measured temperature of sample 10.

Figure 3:
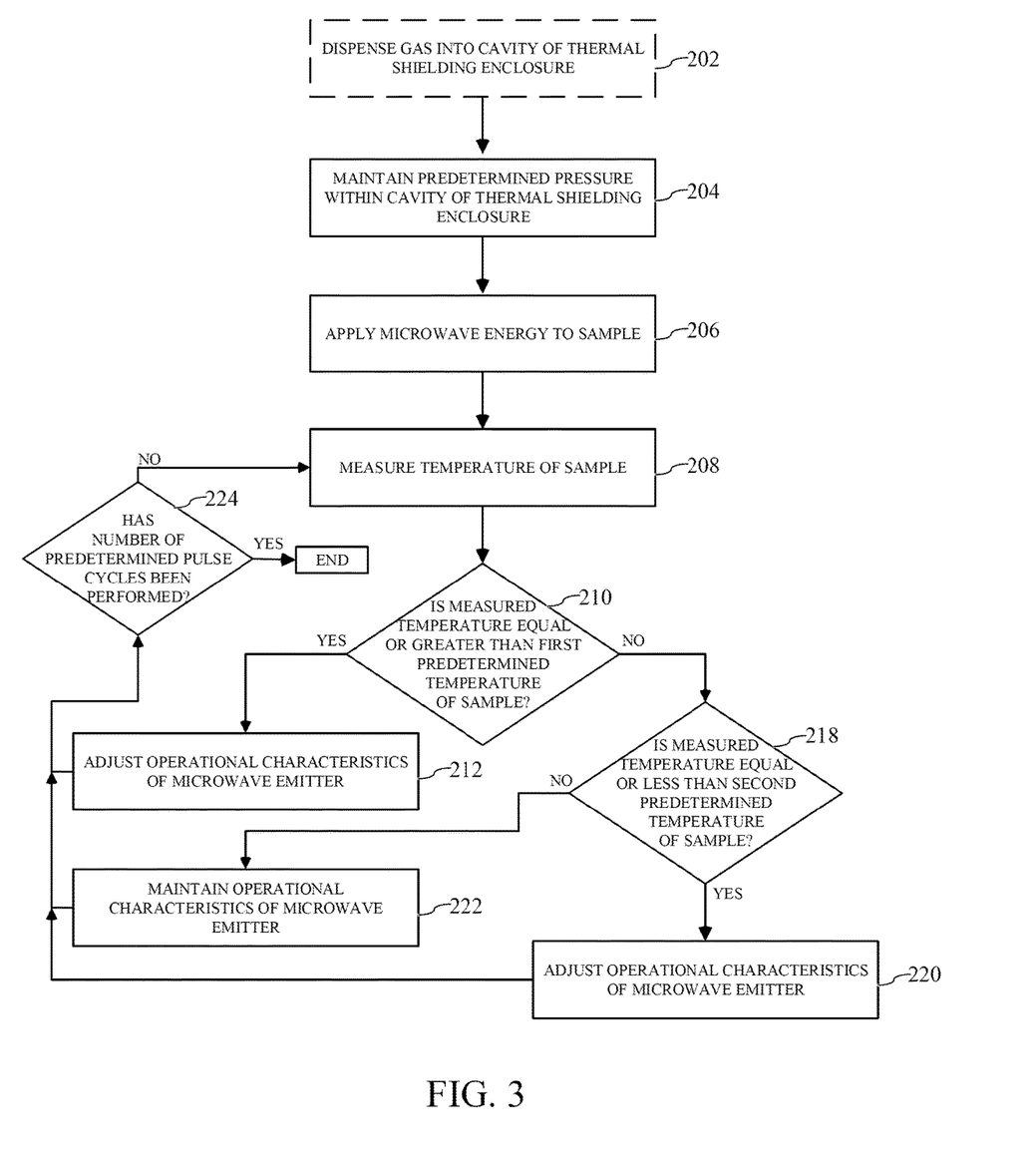
FIG. 3 shows a flowchart illustrating a process for annealing a sample, according to embodiments of the disclosure.

FIG. 3 depicts example processes 200 for annealing a sample. Specifically, FIG. 3 is a flowchart depicting one example process 200 for annealing a sample and/or the material formed therein. In some cases, a system may be used to perform the annealing process, as discussed above with respect to FIGS. 1 and 2, as well as FIGS. 4 and 5.

In process 202, shown in phantom as optional, a gas may be dispensed into a cavity of a thermal shielding enclosure. More specifically, and subsequent to securing and/or placing a sample to be annealed within the cavity of the enclosure, the enclosure may be sealed, and a gas may be dispersed therein. The gas may substantially fill the cavity of the enclosure, and may surround the sample positioned therein. In a non-limiting example the gas may include nitrogen.

In process 204 a predetermined pressure may be maintained within the enclosure. That is, once the sample is positioned within the cavity, the enclosure may be sealed, and the pressure within the cavity of the enclosure may be adjusted and/or may include a predetermined pressure. The cavity may be maintained at the predetermined pressure during the course of the annealing process (e.g., processes 206-222) discussed herein.

In process 206 a microwave energy may be applied to the sample. More specifically, a microwave energy may be applied to the sample and/or may be applied to the material of the sample undergoing the annealing process. In a non-limiting example, microwave energy may be applied using at least one microwave energy emitter positioned within the cavity of the enclosure. The microwave energy may be applied and/or emitted by the microwave emitter with predetermined operational characteristics. The operational characteristics may include a power output of the microwave emitter, a pulse length of the microwave emitter, and/or a number of pulse cycles performed by the microwave emitter. In one non-limiting example, the microwave energy applied to the sample may include a first predetermined power output or a second predetermined power output. The first and second predetermined power outputs may be predetermined and/or calculated based on material/mechanical characteristics of the sample and/or the material of the sample undergoing the annealing process. Additionally in this example, the second predetermined power output may be less than or lower than the first predetermined power output.

In process 208 a temperature of the sample may be measured. More specifically, the temperature of the sample and/or the material of the sample being annealed may be measured, detected, determined, and/or obtained. In non-limiting examples, the temperature of the sample may be measured, detected, and/or determined based on a request (e.g., poll from a control system), intermittently, or continuously. Measuring the temperature of the sample may include measuring a center of the sample, measuring at least one edge of the sample and/or measuring adjacent at least one edge of the sample. The temperature of the sample may be measured using any suitable device and/or component including, but not limited to, an infrared sensor.

In process 210, it may be determined if the measured temperature of the sample (e.g., process 208) is equal to or greater than a first predetermined temperature of the sample. The first predetermined temperature may be based on, at least in part, the material composition of the sample 10, and more specifically the material undergoing the annealing process, and/or the electrical conductivity of the material of the sample undergoing the annealing process. Furthermore, the first predetermined temperature may also be a temperature below a predefined and/or calculated degradation temperature for and/or specific to the material of the sample.

In response to determining that the measured temperature of the sample equals or is greater than the first predetermined temperature of the sample (e.g., "YES" at process 210), operational characteristics of the microwave emitter may be adjusted in process 212. That is, where the measured temperature of the sample is equal to or greater than the first predetermined temperature of the sample, at least one operational characteristic of the microwave emitter applying the microwave energy to the sample may be adjusted, altered, and/or changed. The adjustment of the microwave energy may be based, at least in part on material/mechanical/electrical characteristics of the sample. Adjusting the operational characteristics of the microwave emitter may include altering the power/intensity output of the microwave emitter, altering the pulse length of the microwave emitter, and/or altering the number of pulse cycles performed by the microwave emitter. Additionally, adjusting the operational characteristics of the microwave emitter in process 212 may also include adjusting the operational characteristics of the microwave emitter to prevent the measure temperature of the sample from being equal to or greater than the calculated degradation temperature for the sample. Continuing the non-limiting example above discussed herein with respect to process 206, adjusting the operational characteristics of the microwave energy in process 212 may include adjusting or altering the microwave energy applied to the sample from the first predetermined power output to a second predetermined power output.

In response to determining that the measured temperature of the sample is not equal to or greater than the first predetermined temperature of the sample (e.g., "NO" at process 210), it may be determined if the measured temperature of the sample (e.g., process 208) is equal to or less than a second predetermined temperature of the sample in process 218. Similar to the first predetermined temperature, the second predetermined temperature may be based on, at least in part, the material composition of the sample 10, and more specifically the material undergoing the annealing process, and/or the electrical conductivity of the material of the sample undergoing the annealing process. The second predetermined temperature may be below and/or less than the first predetermined temperature (e.g., process 210).

In response to determining that the measured temperature of the sample equals or is less than the second predetermined temperature of the sample (e.g., "YES" at process 218), operational characteristics of the microwave emitter may be adjusted in process 220. That is, where the measured temperature of the sample is equal to or less than the second predetermined temperature of the sample, at least one operational characteristic of the microwave emitter applying the microwave energy to the sample may be adjusted, altered, and/or changed. Similar to process 212, the adjustment of the microwave energy may be based, at least in part on material/mechanical characteristics of the sample. Adjusting the operational characteristics of the microwave emitter may include altering the power output of the microwave emitter, altering the pulse length of the microwave emitter, and/or altering the number of pulse cycles performed by the microwave emitter. In a non-limiting example where microwave emitter is applying microwave energy to the sample at a second predetermined power output, adjusting the operational characteristics of the microwave energy in process 220 may include adjusting or altering the microwave energy applied to the sample from the second predetermined power output to the first predetermined power output.

In response to determining that the measured temperature of the sample is not equal to or less than the second predetermined temperature of the sample (e.g., "NO" at process 218), operational characteristics of the microwave emitter may be maintained in process 222. More specifically, where the measured temperature of the sample is between the first predetermined temperature (e.g., "NO" at process 210) and the second predetermined temperature (e.g., "NO" at process 218), the operational characteristics of the microwave emitter may be maintained, unchanged, and/or unaltered. In non-limiting examples when the measured temperature of the sample is not equal to or less than the second predetermined temperature of the sample, the microwave emitter may continue to apply microwave energy to the sample at the first or second predetermined power output—unaltered.

In process 224 it may be determined if a number of predetermined pulse cycles has been performed on the sample. Specifically, after adjusting or maintaining the operational characteristics of the microwave emitter, it may be determined if a number of predetermined pulse cycles has been performed on the sample. Each pulse cycle may be represented by, for example, a predetermined exposure time and/or power output for the microwave energy applied to the sample. In response to determining that the number of predetermined pulse cycles has been performed on the sample (e.g., "YES" at process 224), the process may end, indicating that the sample or the material included on the sample has been annealed as desired. Conversely, in response to determining that the number of predetermined pulse cycles has not been performed on the sample (e.g., "NO" at process 224), the process for annealing the sample my continue and/or repeat starting at process 208.

Figure 4:
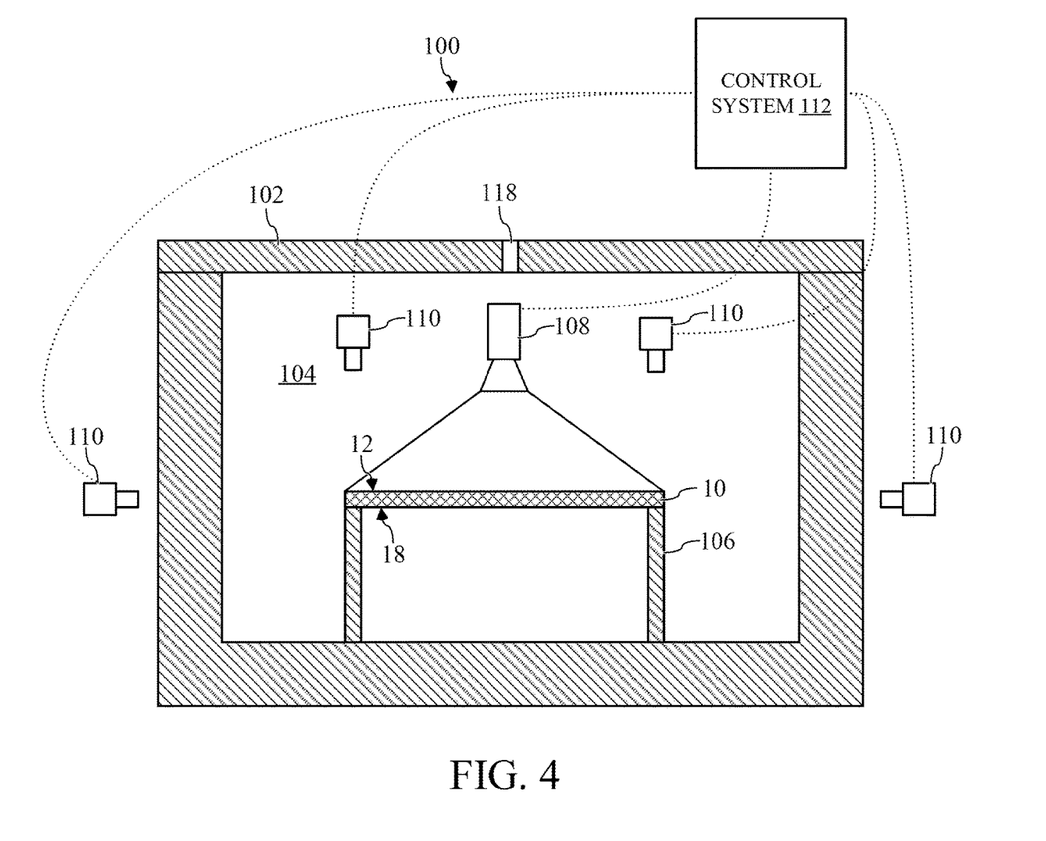
FIGS. 4 and 5 show front cross-sectional views of annealing system, according to additional embodiments of the disclosure.
Figure 5:
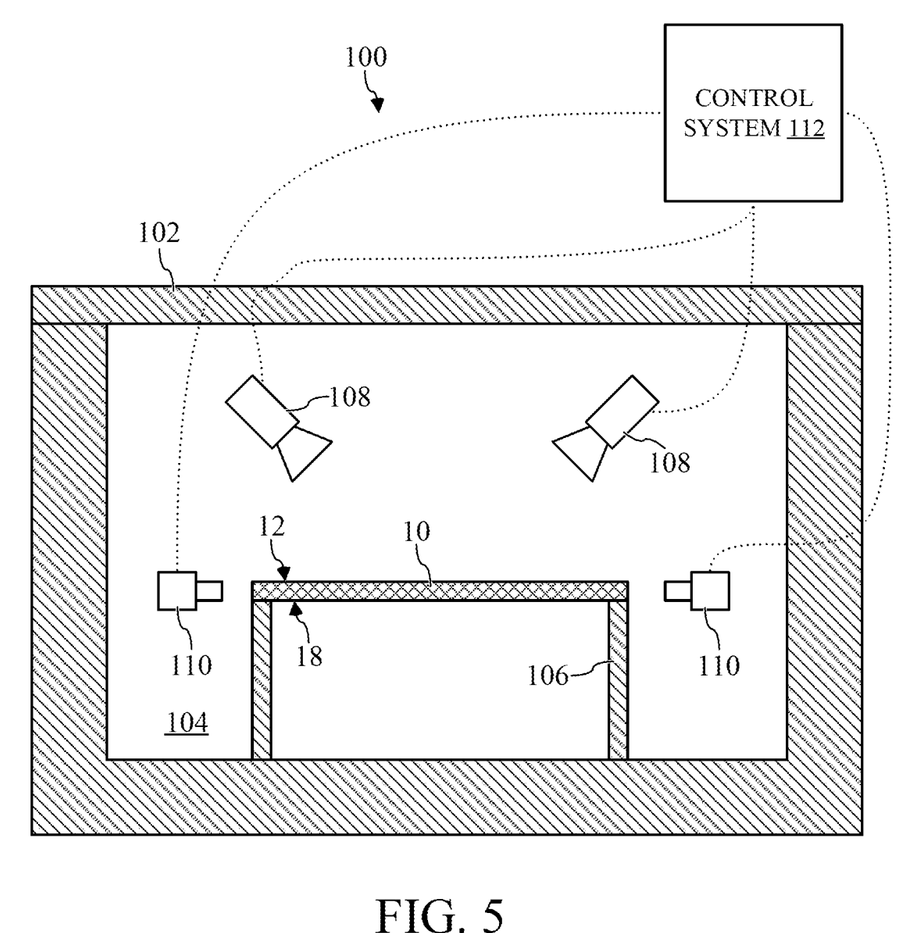

FIGS. 4 and 5 show additional non-limiting examples of system 100. It is understood that similarly numbered and/or named components may function in a substantially similar fashion. Redundant explanation of these components has been omitted for clarity.

Turning to FIG. 4, system 100 may include a plurality of sensors 110. In the non-limiting example, system 100 may include two sensors 110 positioned within cavity 104 of enclosure 102. Each sensor 110 may be positioned within enclosure 102, adjacent first surface 12 of sample 10. Additionally in the non-limiting example shown in FIG. 4, sensor 110 may be positioned within cavity 104 adjacent emitter 108, and/or above sample 10. Based on the position of sensors 110 within cavity 104 and/or with respect to sample 10, sensors 110 may measure, obtain, and/or detect a temperature of sample 10/the material formed thereon by measuring the temperature at or adjacent an edge of sample 10, as discussed herein.

Additionally as shown in FIG. 4, system 100 may include at least one sensor 110 positioned outside of and adjacent to cavity 104 of enclosure 102. Sensor(s) 110 positioned outside of enclosure 102, may be positioned substantially adjacent to and/or aligned with sample 10 positioned within enclosure 102. Although positioned outside of enclosure 102, sensors 110 may measure, obtain, and/or detect a temperature of sample 10/the material formed thereon by measuring the temperature at or adjacent an edge of sample 10, as discussed herein.

Although shown as including sensors 110 positioned both within enclosure 102 and outside/adjacent to enclosure 102, it is understood that system 100 may also include one configuration or the other. That is, in one non-limiting example, system 100 may only include sensor(s) 110 only positioned within enclosure 102. In another non-limiting example, system 100 may only include sensor(s) 110 positioned outside of and/or adjacent to enclosure 102. In either non-limiting example, sensor(s) 110 may measure, obtain, and/or detect a temperature of sample 10/the material formed thereon by measuring the temperature at or adjacent an edge of sample 10, as discussed herein.

The non-limiting example of system 100 shown in FIG. 4 may also include at least one passage 118 formed through enclosure 102. That is, enclosure 102 of system 100 may include passage(s) 118 that may provide and/or allow fluid communication with cavity 104 once enclosure 102 is closed and sealed, as discussed herein. Passage(s) 118 may include any suitable, sealable conduit that may allow for a gas to be dispensed or dispersed throughout cavity 104 of enclosure 102 during the annealing process. For example, after enclosure is closed and sealed, a gas (e.g., nitrogen) may be dispensed into and dispersed throughout cavity 104 using passage(s) 118 prior to or simultaneous to emitter 108 emitting a microwave energy. Dispensing gas into cavity 104 (and subsequently pressurizing enclosure 102) may improve the annealing process as similarly discussed herein with respect to FIGS. 1 and 2. The gas may be dispensed into sealed cavity 104 concurrently or alternative to sealing cavity 104 to include a predetermined pressure during the annealing process discussed herein.

Turning to FIG. 5, another non-limiting example of system 100 is shown. In the example, system 100 may include two sensors 110 positioned within cavity 104 of enclosure 102. Each sensor 110 may be positioned within enclosure 102, adjacent sample 10. More specifically, each sensor 110 may be positioned directly adjacent sample 10, between first surface 12 and second surface 18. The sensors 110 may also be positioned opposite one another and/or adjacent opposite sides of sample 10. Also shown in FIG. 5, sensors 110 may be positioned within cavity 104 adjacent and/or below emitter 108. Based on the position of sensors 110 within cavity 104 and/or with respect to sample 10, sensors 110 may measure, obtain, and/or detect a temperature of sample 10/the material formed thereon by measuring the temperature at or adjacent an edge of sample 10, as discussed herein.

System 100 shown in FIG. 5 may also include two distinct emitters 108. Emitters 108 of system 100 may be positioned within cavity 104 of enclosure 102, and may be positioned adjacent sample 10 received by support 106. In the non-limiting example shown in FIG. 5, emitters 108 may be positioned adjacent to and substantially above sample 10. Where first surface 12 or the material formed on first surface 12 of sample 10 requires annealing, first surface 12 may be positioned directly adjacent to and/or exposed to each emitter 108 within enclosure 102. Each emitter 108 may provide microwave energy to first surface of sample 10 during the annealing process. Two emitters 108 included in system 100, as shown in the non-limiting example of FIG. 5 may increase the sample area being annealed, and/or may provide intentional variations of annealing conditions/parameters during the annealing of sample 10.

FIGS. 6-9 show other non-limiting examples of charts including measured, detected, obtained, and/or calculated data for system 100 during the annealing process. As discussed herein, each chart represents another non-limiting example of performing an annealing process on a sample using the systems 100 discussed herein with respect to FIGS. 1, 4, and 5. It is understood that similarly numbered and/or named components may function in a substantially similar fashion. Redundant explanation of these components has been omitted for clarity.

Figure 6:
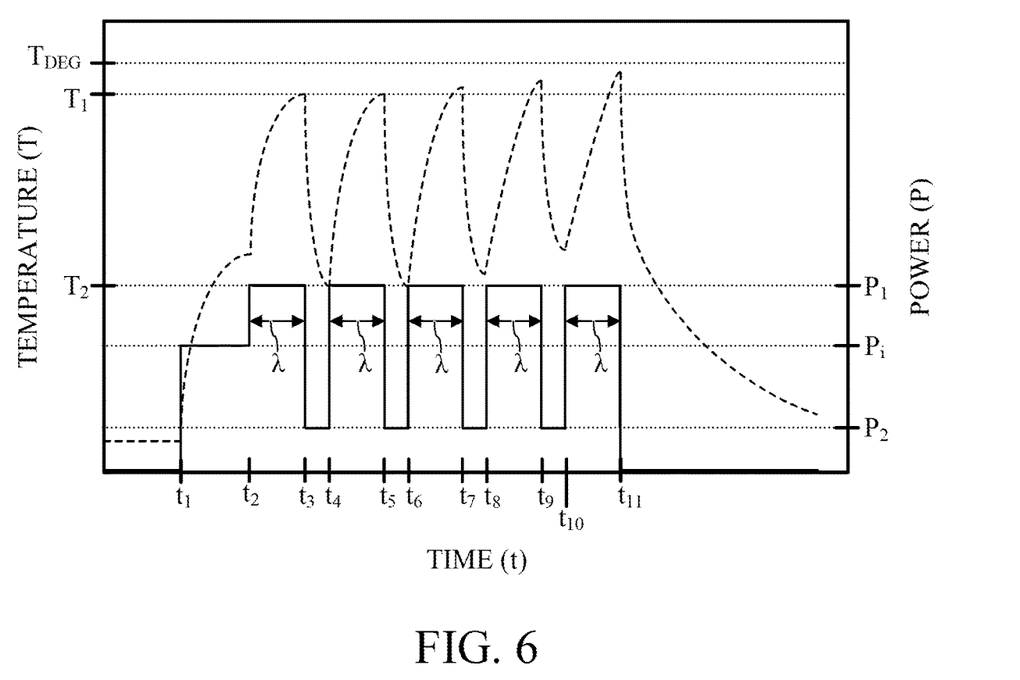
FIGS. 6-9 show various charts including a measured temperature of a sample and a power output of a microwave emitter of the annealing system shown in FIG. 1 undergoing an annealing process, according to embodiments of the disclosure.

In the non-limiting example shown in FIG. 6, the power outputs (P1, P2), pulse length (λ) for the microwave energy emitted by emitter 108, and the pulse cycle length may all be constant, fixed, and/or the same in each pulse cycle. That is, and distinct from the non-limiting example shown and discussed herein with respect to FIG. 2, the pulse length (λ) at the first predetermined power output (P1) in each pulse cycle for emitter 108 may be constant and/or the same between pulse cycles. In the non-limiting example, the measured temperature of sample 10 may exceed the first predetermined temperature (T1) in later pulse cycles. For example, in the third, fourth, and fifth pulse cycle, the measure temperature of sample 10 may exceed the first predetermined temperature (T1). However, in each of these pulse cycles the measured temperature may not exceed the predefined and/or calculated degradation temperature (T$_{deg}$). If the measured temperature equals the degradation temperature (T$_{deg}$), control system 112 may engage an immediate response by reducing the power output of emitter 108 to prevent the measured temperature from exceeding degradation temperature (T$_{deg}$).

Additionally because the pulse cycle length is constant between pulse cycles and/or the power output is alternating between the first power output (P1) and the second power output (P2), the temperature of sample 10 may not reach and/or lower to the second predetermined temperature (T2) in each cycle. Specifically, in the third, fourth, and fifth pulse cycle, the measure temperature of sample 10 may not lower to the second predetermined temperature (T2) as a result of the measured temperature exceeding the first predetermined temperature (T1) in the same pulse cycle.

In another non-limiting example (not shown) the pulse length (λ) at the first predetermined power output (P1) in each pulse cycle for emitter 108 may be constant and/or the same between pulse cycles, however, the pulse cycle length may differ between pulse cycles. More specifically, the time in which the emitter 108 is operating at the second predetermined power output (P2) may be longer/greater in the later phase cycles. For example, in third, fourth, and fifth pulse cycle where the measured temperature of sample 10 exceeds the first predetermined temperature (T1), the sample 10 may be required to be exposed to microwave energy at the second predetermined power output (P2) for a longer period of time to ensure that sample 10 can cool/reach the second predetermined temperature (T2). Distinct from the non-limiting example shown in FIG. 6, control system 112 may operate emitter 108 at the second predetermined power output (P2) until the temperature of sample 10 reaches the second predetermined temperature (T2). In the non-limiting example the temperature of sample 10 may still exceed the first predetermined temperature (T1) when exposed to microwave energy operating at the first predetermined power output (P1), but may still not exceed the degradation temperature (T$_{deg}$). Additionally with comparison to and distinct from the example of FIG. 6, the temperature may not get as close to degradation temperature (T$_{deg}$) where the temperature of sample 10 reaches the second predetermined temperature (T2) in each pulse cycle, as discussed herein.

Figure 7:
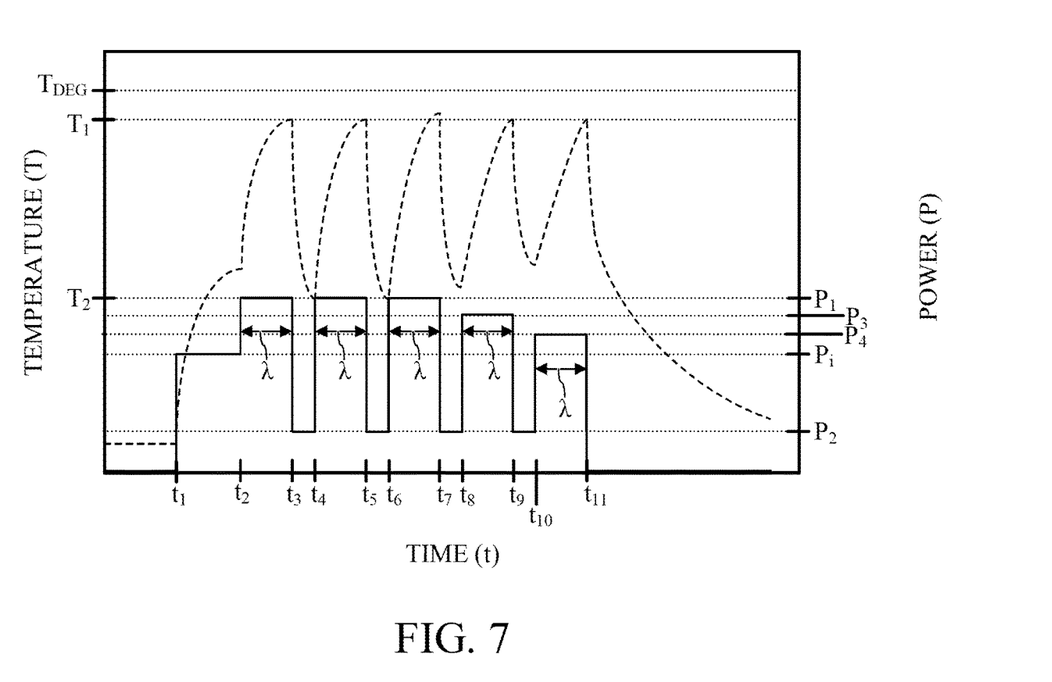

As shown in FIG. 7, and similar to FIG. 6, the pulse length (λ) for the microwave energy emitted by emitter 108, and the pulse cycle length may all be constant, fixed, and/or the same in each pulse cycle. However, in the non-limiting exampling of FIG. 7, the power output (P1, P2) for emitter 108 may not be constant and/or consent for each pulse cycle. Specifically, in later pulse cycles (e.g., fourth and fifth pulse cycles), the power output for emitter 108 may be reduced or stepped to be below or less than the first predetermined power output (P1). The power output for emitter 108 may be reduced and/or stepped in later stages as a result of control system 112 determining that the measure temperature of the sample 10 exceeds the first predetermined temperature (T1). For example, control system 112 may determine that in the third pulse cycle (e.g., time (t6-t7) the measure temperature of sample 112 exceeds the first predetermined temperature (T1). As a result, control system 112 may adjust the operational characteristics, and more specifically the power output of emitter 108 in subsequent cycles to prevent the temperature of sample 10 from exceeding first predetermined temperature (T1), but also maintain the same pulse length while heating/applying the microwave energy at the elevated power output. As such, and as shown in FIG. 7, emitter 108 may emit the microwave energy at a third predetermined power output (P3) in the fourth cycle to prevent the measured temperature of the sample from exceeding the first predetermined temperature (T1). As show, the third predetermined power output (P3) is below the first predetermined power output (P1).

Additionally in the non-limiting example, the power output may further me reduced and/or stepped in subsequent pulse cycles. For example, in the fifth stage of the pulse cycle the power output of emitter 108 may be adjusted to a fourth predetermined power output (P4) that is below the first predetermined power output (P1) and the third predetermined power output (P3) respectively. Power output for emitter 108 may be further adjusted, reduced, and/or stepped in subsequent pulse cycles to ensure the measure temperature of sample 10 does not exceed and/or is maintained below first predetermined temperature (T1). The need to further adjust/reduce the power output of emitter 108 may be a result of the change in electrical conductivity of sample 10/the material formed thereon on in the later pulse cycles.

In this non-limiting example, although sample 10 may not exceed the first predetermined temperature (T1) after the third pulse cycle, sample 10 may also not reach the second predetermined temperature (T2), so long as the pulse length and cycle length remain constant during the annealing process. In another non-limiting example (not shown), the pulse cycle length may also vary or not be constant to ensure sample 10 can reduce or lower its temperature to the second predetermined temperature (T2) at each pulse cycle. As similarly discussed herein, this may be accomplished by extending the exposure or application time of emitter 108 operating at the second predetermined power output (P2) in later pulse cycles.

Figure 8:
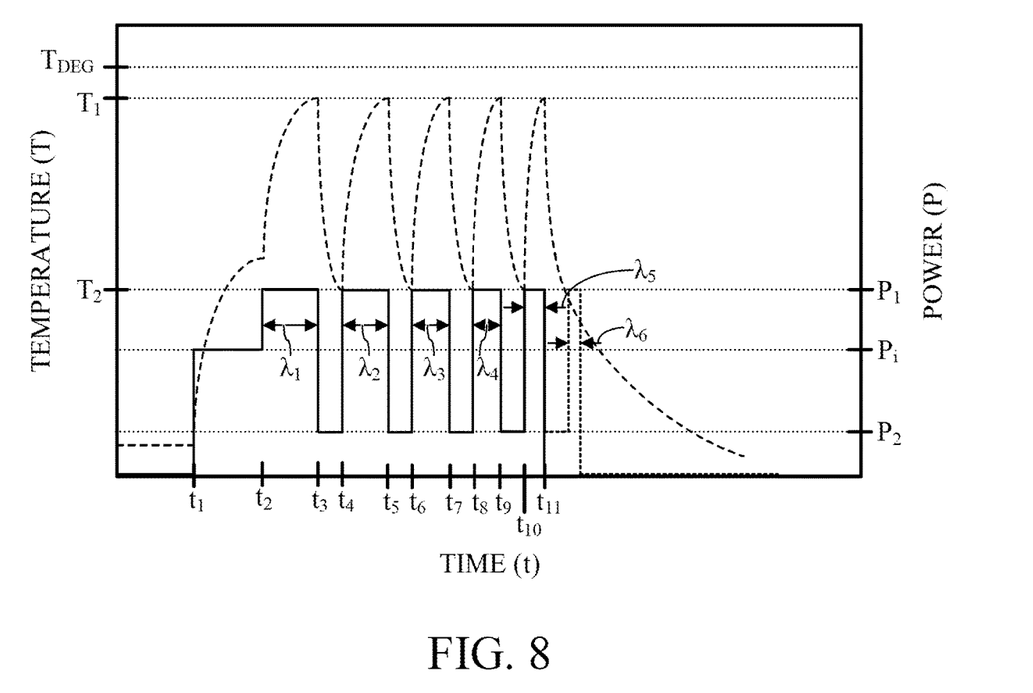

In the non-limiting example shown in FIG. 8, control system 112 may adjust the number of pulse cycles for emitter 108 during the annealing process. That is, and as discussed herein, in order to anneal sample 10/the material formed therein, sample 10 may undergo a predetermined amount of pulse cycles and/or exposure to microwave energy emitted by emitter 108. The predetermined amount or number of pulse cycles may be based on, at least in part, material/mechanical characteristics of sample 10, the material of sample 10, and/or the thermal/electrical conductivity of the material of sample 10 that is undergoing the annealing process. However, during the annealing process control system 112 may obtain and/or process received data and subsequently adjust the number of pulse cycles in which sample 10 may undergo during the annealing process. Control system 112 may determine, detect, and/or obtain information not only relating to the temperature of sample 10 during the annealing process, but also the rate of change in temperature. Analyzing the rate of change in temperature and/or determining how quickly sample 10 reaches the first predetermined temperature (T1) from the second predetermined temperature (T2), control system 112 may reduce/increase the number of pulse cycles experienced by sample 10. For example, and as shown in FIG. 8, control system 112 may determine that rate of change between the second predetermined temperature (T2) and the first predetermined temperature (T1) exceeds a predetermined and/or calculated temperature rate of change in the fifth pulse cycled (e.g., times t10-t11). Based on the temperature rate of change for sample 10, control system 112 may determine that the electrical conductivity of sample 10/the material included therein has changed as desired, and ultimately sample 10 may be annealed as desired. As a result, control system 112 may forgo a sixth pulse cycle for sample 10, and may subsequently turn-off emitter 108.

Figure 9:
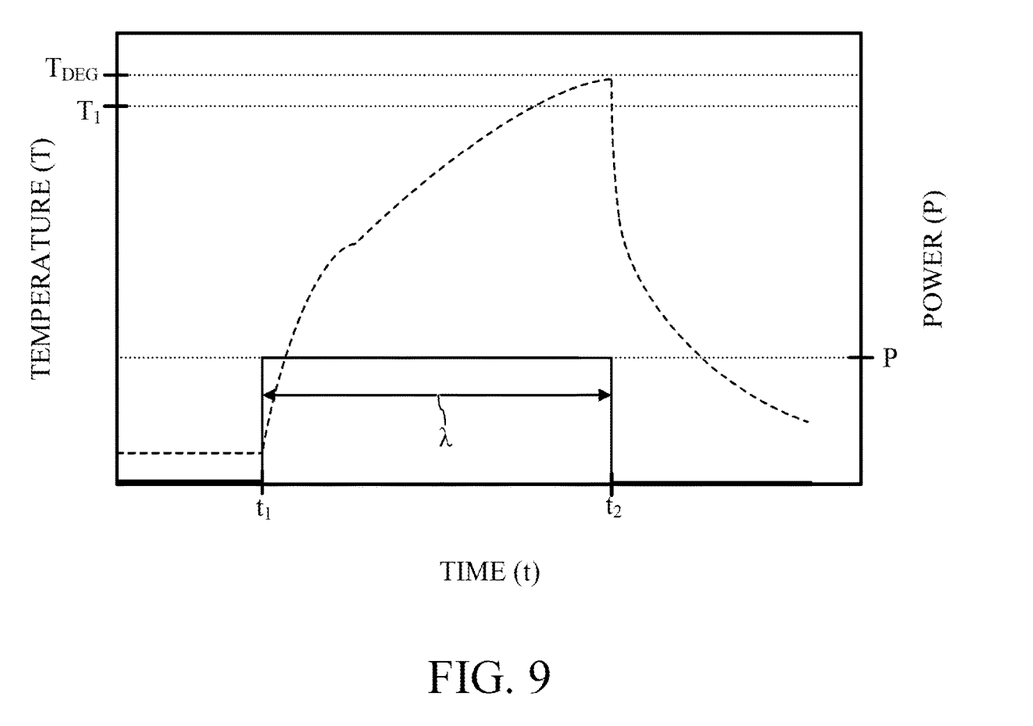

FIG. 9 shows a non-limiting example where sample 10 is annealed under a single, constant microwave power output and pulse cycle. Specifically, sample 10 may be annealed using system 100 where emitter 108 emits a microwave energy at a predetermined power output (P) until the measured temperature of sample 10 exceeds the first predetermined temperature (T1), and (almost) reaches or is heated to the predefined and/or calculated degradation temperature ($T_{deg}$). Once the measured temperature of sample 10 (nearly) reaches or is heated to the predefined and/or calculated degradation temperature ($T_{deg}$), control system 112 may turn off emitter 108 to cool or reduce the temperature of sample 10.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A multi-pulse-rapid thermal annealing system, the system comprising:
   a thermal shielding enclosure including a cavity, the cavity receiving a sample having a first surface and a second surface opposite the first surface, the sample comprised of a material;
   a microwave emitter positioned within the cavity of the thermal shielding enclosure;
   a sensor positioned within the cavity of the thermal shielding enclosure; and
   a control system electrically coupled to the microwave emitter and the sensor, the control system configured to adjust at least one operational characteristic of the microwave emitter by performing processes including:
      measuring a temperature of the sample using the sensor;
      determining a conductivity of the material of the sample based upon the temperature; and based upon the determined conductivity, at least one of:
         adjusting the at least one operational characteristic of the microwave emitter in response to the measured temperature of the sample being equal to or greater than a first predetermined temperature of the sample, or
         adjusting the at least one operational characteristic of the microwave emitter in response to the measured temperature of the sample being equal to or less than a second predetermined temperature of the sample.

2. The system of claim 1, wherein the sensor is positioned adjacent the first surface of the sample.

3. The system of claim 1, wherein the sensor is positioned adjacent to the second surface of the sample.

4. The system of claim 1, wherein the sensor is positioned adjacent the sample, substantially between the first surface and the second surface of the sample.

5. The system of claim 1, wherein the sensor operates in an IR range.

6. The system of claim 1, wherein the shielding enclosure includes an inert gas dispersed throughout the cavity.

7. The system of claim 1, wherein the thermal shielding enclosure cavity includes a predetermined pressure during operation of the microwave emitter.

8. The system of claim 1, wherein the sample includes at least one of: GaN, AlN, InN, AlInN, GaAlInN, SiC, or GaO.

9. The system of claim 1, wherein the first predetermined temperature and the second predetermined temperature of the sample are based on at least one of the material of the sample or an electrical conductivity of the material of the sample.

10. The system of claim 9, wherein the first predetermined temperature is below a calculated degradation temperature for the material of the sample.

11. The system of claim 1, wherein the first predetermined temperature is greater than the second predetermined temperature.

12. The system of claim 1, wherein the at least one operational characteristics further includes at least one of:
  a power output of the microwave emitter,
  a pulse length of the microwave emitter, or
  a number of pulse cycles of the microwave emitter.

13. The system of claim 1, wherein the control system performs processes further including:
  maintaining the at least one operational characteristic of the microwave emitter in response to the measured temperature of the sample being between the first predetermined temperature of the sample and the second predetermined temperature of the sample.

14. A method for annealing a material included within a sample, the method comprising:
  applying a microwave energy to the sample using a microwave emitter, the sample having a first surface and a second surface opposite the first surface, the sample comprised of a material;
  measuring a temperature of the sample receiving the microwave energy, the temperature indicating a conductivity of the material of the sample;
  determining a conductivity of the material of the sample based upon the temperature; and
  based upon the determined conductivity, at least one of:
    adjusting at least one operational characteristic of the microwave emitter in response to the measured temperature of the sample being equal to or greater than a first predetermined temperature of the sample, or
    adjusting at least one operational characteristic of the microwave emitter in response to the measured temperature of the sample being equal to or less than a second predetermined temperature of the sample.

15. The method of claim 14, wherein the measuring of the temperature of the sample further includes at least one of:
  measuring a center of the sample, or
  measuring at least one edge of the sample.

16. The method of claim 14, further comprising at least one of:
  dispensing nitrogen into a cavity of a thermal shielding enclosure, the cavity receiving the sample, or
  maintaining a predetermined pressure within the cavity of the thermal shielding enclosure during the applying of the microwave energy to the sample.

17. The method of claim 14, wherein the first predetermined temperature of the sample and the second predetermined temperature of the sample are based on at least one of a material of the sample or an electrical conductivity of the material of the sample.

18. The method of claim 17, wherein the adjusting the at least one operational characteristic of the microwave emitter further includes adjusting the at least one operational characteristic of the microwave emitter to prevent the measured temperature of the sample from being equal to or greater than a calculated degradation temperature for the material of the sample, wherein the calculated degradation temperature for the material of the sample is greater than the first predetermined temperature.

19. The method of claim 14, further comprising:
  maintaining the at least one operational characteristic of the microwave emitter in response to the measured temperature of the sample being between the first predetermined temperature of the sample and the second predetermined temperature of the sample.

20. A multi-pulse-rapid thermal annealing system, the system comprising:
  a shielding means for thermal shielding an enclosure including a cavity, the cavity receiving a sample having a first surface and a second surface opposite the first surface, the sample comprised of a material;
  a microwave emitting means for emitting microwaves positioned within the cavity of the shielding means;
  a sensing means for sensing, at least, temperature, the sensing means positioned within the cavity of the shielding means; and
  a control means electrically coupled to the microwave emitting means and the sensing means, the control means for adjusting at least one operational characteristic of the microwave emitting means by:
  measuring a temperature of the sample using the sensing means, the temperature indicating a conductivity of the material of the sample;
  determining a conductivity of the material of the sample based upon the temperature; and
  based upon the determined conductivity, at least one of:
  adjusting the at least one operational characteristic of the microwave emitting means in response to determining the measured temperature of the sample being equal to or greater than a first predetermined temperature of the sample, or
  adjusting the at least one operational characteristic of the microwave emitting means in response to determining the measured temperature of the sample being equal to or less than a second predetermined temperature of the sample.

* * * * *